United States Patent
Lankford et al.

[11] B 3,986,010
[45] Oct. 12, 1976

[54] AUTOMATIC TOOL DEFLECTION CALIBRATION SYSTEM

[75] Inventors: Larry Gene Lankford, Mahopac; William Robert Whittle, Yorktown Heights, both of N.Y.

[73] Assignee: International Business Machines Corporation, Armonk, N.Y.

[22] Filed: Jan. 14, 1975

[21] Appl. No.: 540,767

[44] Published under the second Trial Voluntary Protest Program on March 16, 1976 as document No. B 540,767.

Related U.S. Application Data
[63] Continuation of Ser. No. 390,990, Aug. 23, 1973.

[52] U.S. Cl............................ 235/151.11; 318/572; 444/1
[51] Int. Cl.$^2$......................................... G06F 15/46
[58] Field of Search............... 235/151.11; 318/569, 318/571, 572, 561, 573, 574; 408/11; 444/1

[56] References Cited
UNITED STATES PATENTS

| | | |
|---|---|---|
| 3,220,315 | 11/1965 | Mathias ........................ 408/11 X |
| 3,573,588 | 4/1971 | Geyer et al. ........................ 318/571 |
| 3,602,090 | 8/1971 | Whetham ................ 235/151.11 UX |
| 3,675,517 | 7/1972 | Tadayoshi ........................ 408/11 X |
| 3,720,120 | 3/1973 | Cutler ............................ 318/571 X |

*Primary Examiner*—Joseph F. Ruggiero
*Attorney, Agent, or Firm*—Graham S. Jones, II

[57] ABSTRACT

A computer-controlled machine tool includes force deflection and tool-part contact sensors. A tool is inserted in the chuck of the automatic machine tool and the tool is driven over a deflection testing pad on the work support so that upon contact a first tool deflection force is measured. Then the tool is driven a small increment in the same direction to provide a second but greater tool deflection force in the same direction. Then the computer calculates the differential value of the tool deflection force over the distance moved. Also the error between estimated and actual tool diameter is calculated from the difference between the tool offset value used and the distance required for adjustment of the tool from a spaced starting position to contact with the pad.

28 Claims, 18 Drawing Figures

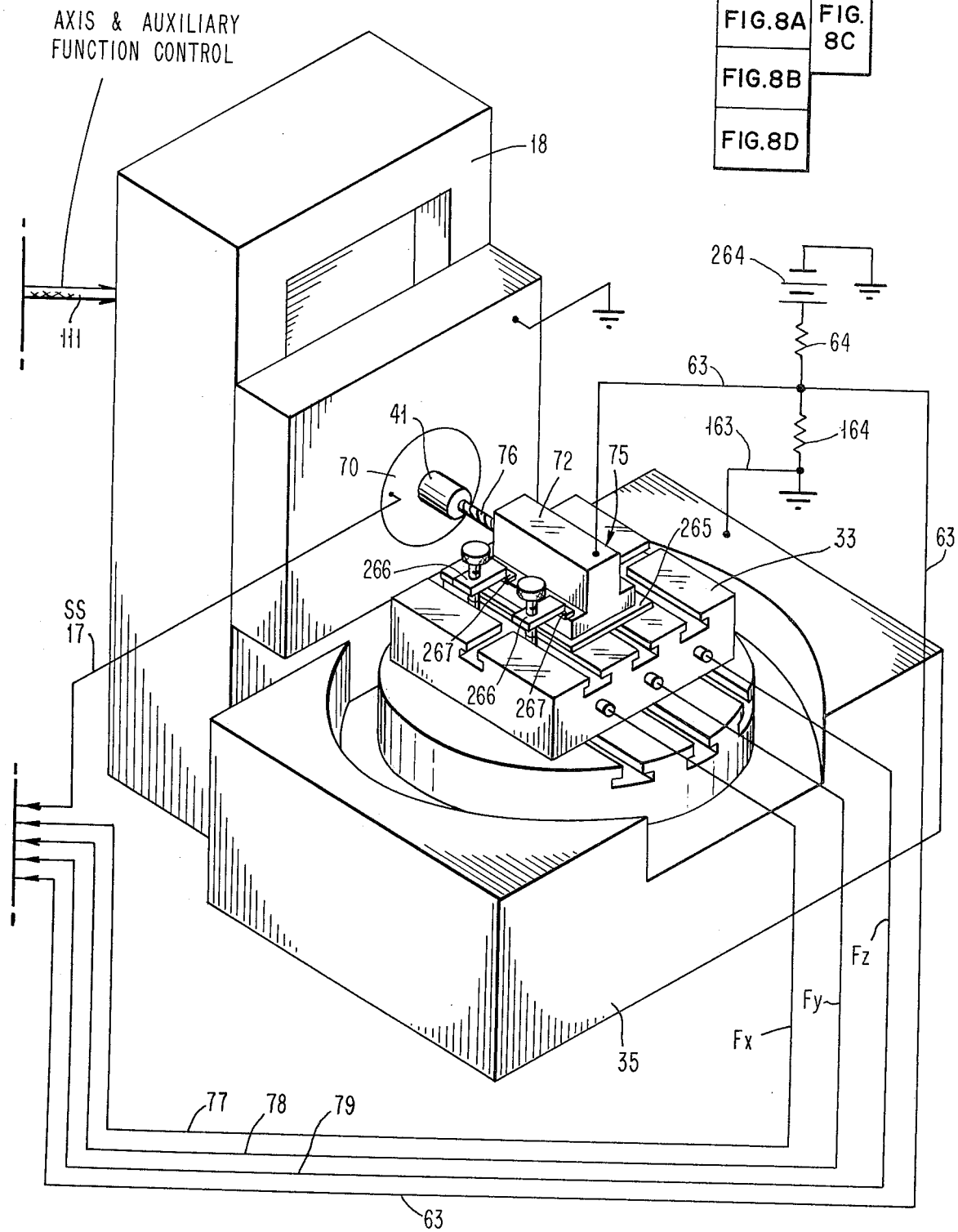

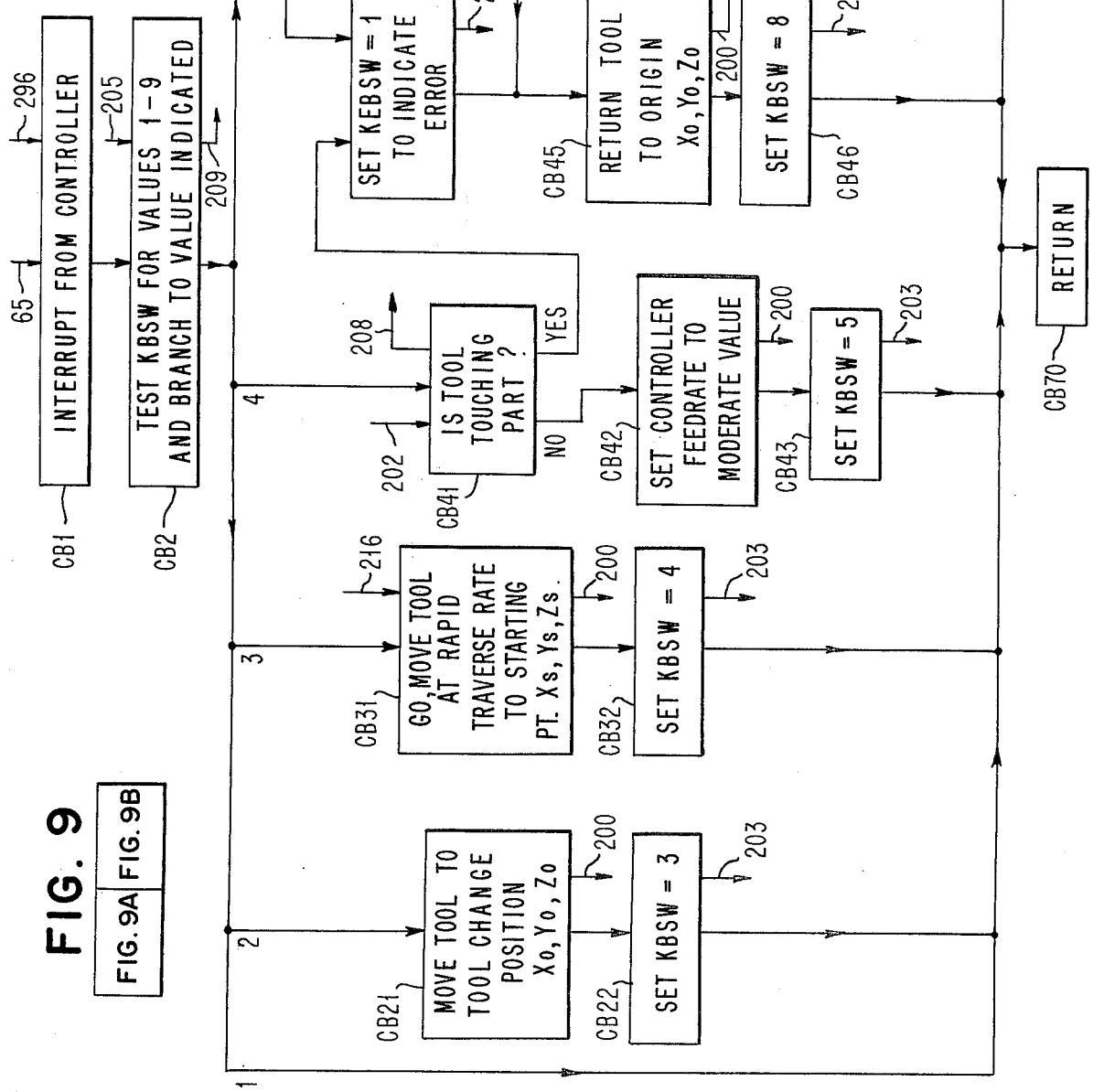

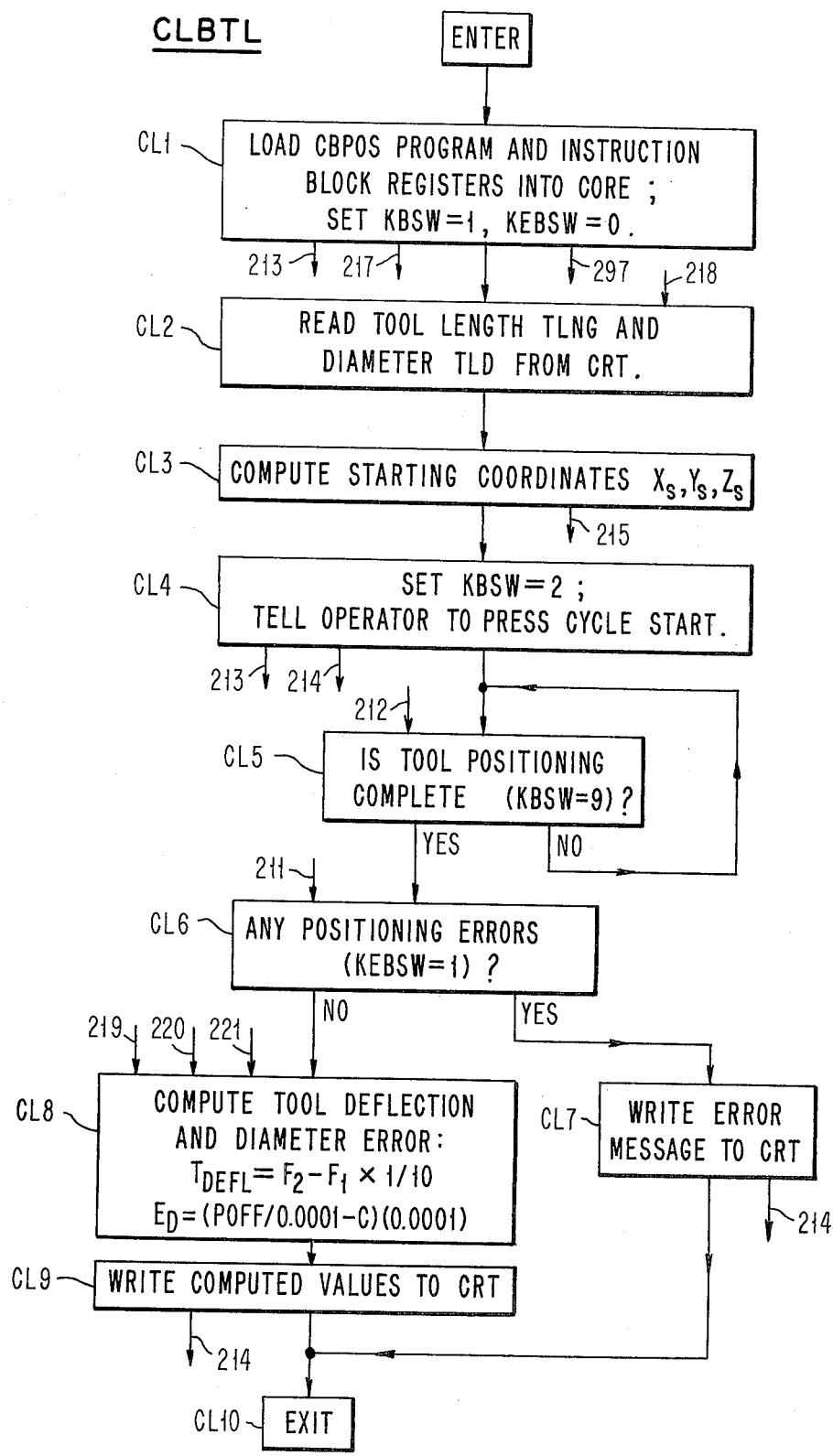

AUTOMATIC TOOL DEFLECTION CALIBRATION SYSTEM

CROSS-REFERENCE TO RELATED APPLICATION

This is a continuation of Ser. No. 390,990 filed Aug. 23, 1973. This application is related to copending U.S. application Ser. No. 267,802, filed June 30, 1972, entitled "Adaptive Numerical Control of Machine Tool in Response to Deflection Forces Transverse to Cutting Path", of Lankford et al.

BACKGROUND OF THE INVENTION

1. Field of the Invention

This invention relates to a computer-controlled, numerical-control system for machine tools which determines force per unit tool deflection and diameter error based upon variables measured at the machine tool prior to a machining operation. More particularly, this invention relates to a method of operating a computer-controlled, numerical-control system for determining tool deflection and diameter error using a previously prepared numerical-control program to control the machine tool.

2. Description of the Prior Art

In computer-controlled and numerically-controlled automatic machine tool systems correction of machining errors caused by tool deflection has been achieved by means of trial and error techniques, wherein a part is machined and the quantity of error measured is indicative of the correction required in the program.

Other prior art has taught providing deflection sensors to provide dynamic tool deflection information to an adaptive control system.

Still other prior art teaches sensing of contact of a tool with a work piece in a numerically-controlled machine tool by means of a vibration sensing mechanism.

However, none of the prior art contemplates avoiding deflection error prior to operating the tool, without using a trial and error technique.

SUMMARY OF THE INVENTION

It would be highly desirable to be able to measure the error involved in machine tool motion attirbutable to deflection forces.

Accordingly it is an object of this invention to provide a method and apparatus for calibration of tool deflection error in a machine tool.

Another object of this invention is to provide an automatic system for calibration of a machine tool prior to operation.

Still another object of this invention is to provide means for measuring actual tool diameter during a calibration operation of said machine tool system.

In accordance with this invention a computer-controlled, numerical-control system is provided for calibrating the system on a tool against a firmly supported object. A numerically-controlled machine tool includes contact sensing means for sensing contact of a tool with the object and force sensing means for sensing tool deflection forces. A control controls the numerically-controlled machine tool. A data source generates data directing the tool towards contact with the object having an output coupled to the input of the control.

An incrementing device increments the tool towards the work in response to an output from the contact sensing means. The incrementing means has an output coupled to the input of the control. A register records amounts of displacement.

Calculating means calculates the deflection force on the tool as a function of displacement in response to inputs connected to the force sensing means and the register means.

Further in accordance with this invention a method is provided for operating a computer-controlled machine tool system for calibrating its force deflection characteristics. The tool is moved towards an object firmly supported upon a base. Contact of the tool with said object is sensed.

Tool deflection forces at a first tool position in contact with the object and tool deflection forces at a second tool position in contact with the object and spaced from the first tool position, are both measured. Tool deflection is calculated as a function of tool displacement between the separated positions.

BRIEF DESCRIPTION OF THE DRAWINGS

FIG. 8 shows the composite arrangement of FIGS. 8A, 8B, 8C, and 8D.

FIGS. 8A – 8D when combined show a computer controlled machining system in detailed partially block diagram form and partially perspective form, with the computer program functional units and registers shown as blocks whose linkages are represented by connecting lines.

FIGS. 9A and 9B show computer program CBPOS.

FIGS. 10 show computer program CLBTL.

DETAILED DESCRIPTION OF THE PREFERRED EMBODIMENT

Figure 1:
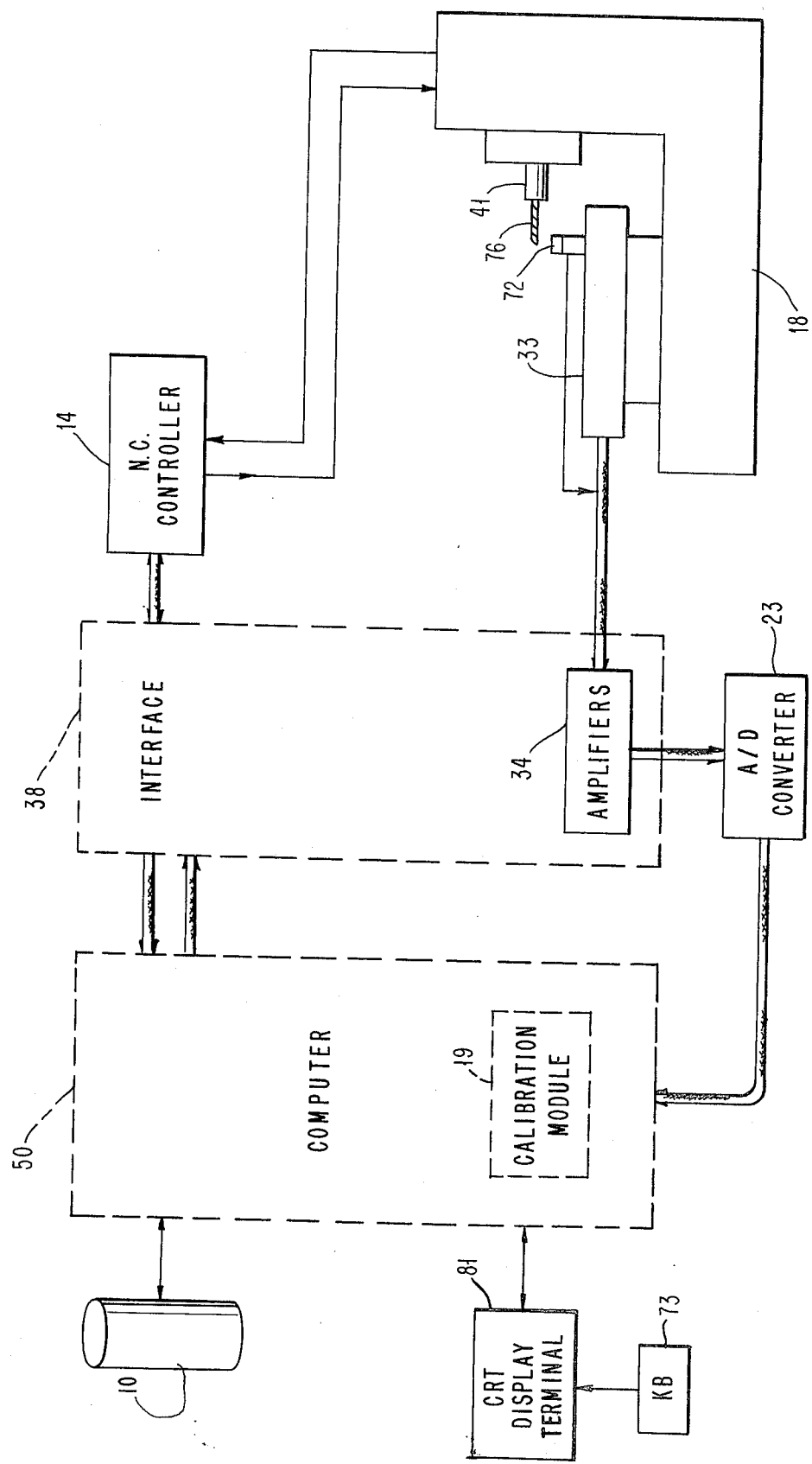
FIG. 1 is a schematic diagram of a computer controlled machine tool system for providing automatic calibration of a machine tool.

The computer controlled machine tool system of FIG. 1 includes a computer 50 capable of accepting digital information regarding force measurements, force sensing devices 33, and a hard surface 72 precisely located on the machine-tool table. Control programming is stored in disc 10 such that with a tool 76 mounted in the machine tool chuck 41 and information input with keyboard 73 by the operator defining tool length and tool diameter, the system measures the force per unit deflection of the tool-machine combination and the difference between the stated tool diameter and the measured tool diameter.

The closed-loop, computer-controlled machining system consists of a control computer 50, analog-to-digital converter 23 and remote keyboard input 73 with cathode ray tube display 81. The computer controls machine tool 18, via standard NC controller 14, which in turn is controlled from the computer 50 via interface 38. Dynamometers 33 sense forces on the machine tool table in cartesian dimensions $x$, $y$ and $z$ and develop electrical signals proportional to those forces. In addition, interface 38 includes amplifiers 34 for amplifying the electrical signals from the dynamometers to a level suitable for transmission and entry to computer 50 via analog-to-digital converter 23. For the purpose of this invention, a hard calibration surface 72 is added to the table on a suitable mounting and computer 50 is programmed to respond in a unique manner. A Brinnel Hardness Number of 100 has been found sufficient for most tools (deflecting in the range of 10 lbs/0.001 inch), however, a hardness of 500 or better is advisable to assure the accuracy of the diameter-error measurement.

The system is based on the idea that deflection of the tool-machine system is identical in units-force per unit-distance (i.e.pounds/milli-inch) whether the indicated position is constant and the tool point is deflected a unit distance by a force or if the tool point position is maintained constant and the indicated position is changed by a unit distance.

Figure 2A:
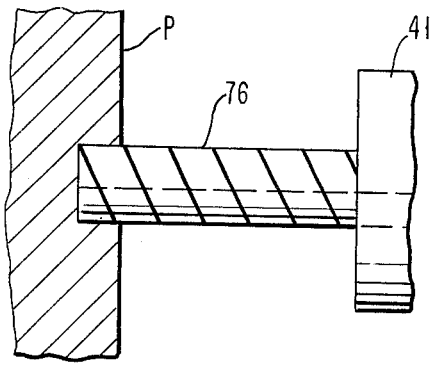
FIG. 2A shows a rotating tool inserted into a workpiece.
Figure 2B:
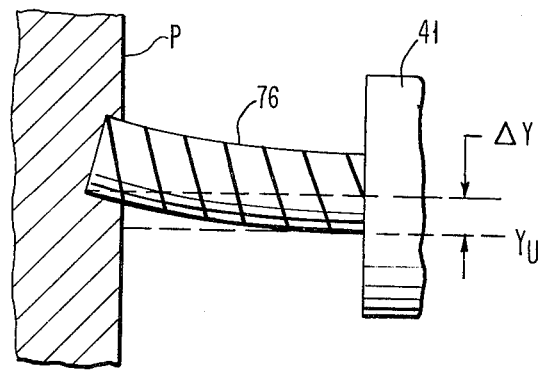
FIG. 2B shows a rotating tool deflected a distance $\Delta Y$ by cutting forces.
Figure 3A:
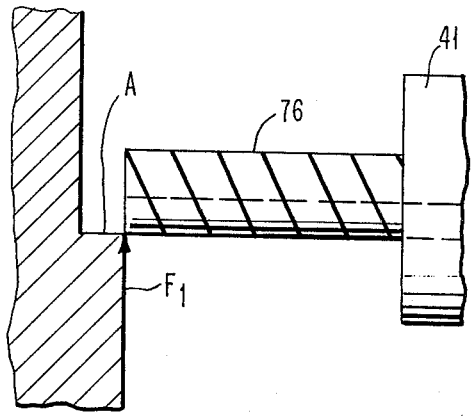
FIG. 3A shows a static tool resting in contact with a static hardened surface.
Figure 3B:
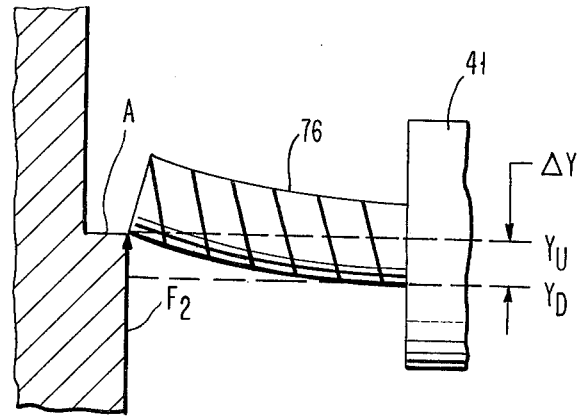
FIG. 3B shows the tool of FIG. 3A moved through distance $\Delta Y$ to produce deflection of the tool.

This is illustrated in FIGS. 2A and 2B with the deflection situation in metalcutting with the tool 76, which while it should be cutting undeflected as shown in FIG. 2A is actually deflected, with its edge diverging from undeflected alignment along line YDU, as shown in FIG. 2B, a certain number of inches ($\Delta Y$) per pound of force by cutting forces. In FIGS. 3A and 3B, a similar situation is shown but here the deflection is caused by a change in position of edge YU to line YD by motion of the machine spindle while the cutting tool point is constrained against a hardened surface (A).

In accordance with the invention the tool 73 is brought up against the hardened surface as in FIG. 3A. The indicated force $F_1$ is read into the computer 50. Then the spindle is moved down 0.01 inches $\Delta Y$ in FIG. 3B, and after a settling time the force $F_2$ is read again. The difference in the force readings ($F_2-F_1$) is the units of force per unit of distance (lbs/0.01 inch).

Figure 6:
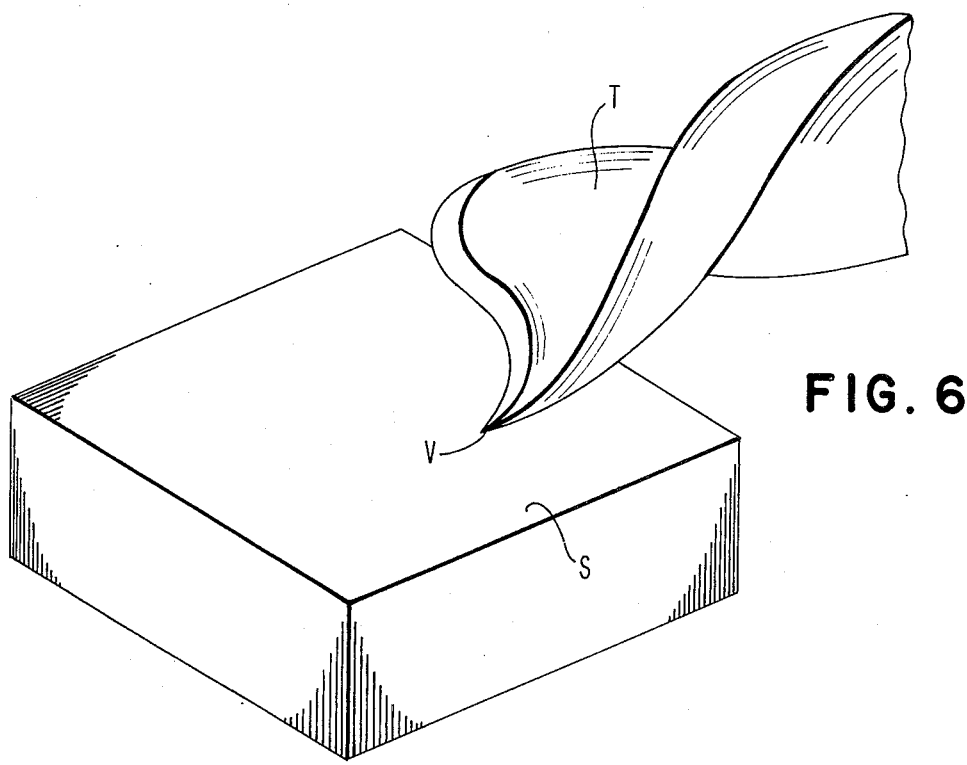
FIG. 6 shows a two flute milling machine cutter on a surface.

It is important that the tool be oriented so that it bears at the location desired. For example, see FIG. 6, which shows a two flute helical milling cutter tool T with the point of the tool oriented to bear on the hardened surface S at point V. Rotating this cutter would place the bearing point further back on the cutter helix. Because maximum deflection occurs at the end of the tool, measurements at the tool point are most sensitive.

OPERATION

Figure 4:
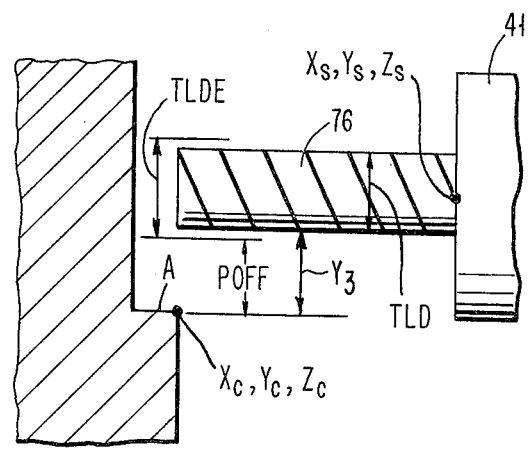
FIG. 4 shows a tool in accordance with FIG. 3A set a distance $Y_3$ above a hardened surface in a start position prior to incrementing it into the position in FIG. 3A.

In operation, the operator instructs the computer of his desire to measure a tool-machine combination by typing on the keyboard 73 of the display terminal 81 the word CALIBRATE followed by a comma and the length of the tool in actual numerical-control terms followed by a second comma and the diameter of the tool followed by an entry key which which causes the computer 50 to accept the data. The computer 50 modifies its control program to fit the length and diameter information and communicates to the operator via terminal 50 that he may start the measuring operation. The operator after assuring that the tool 76 (tool point down) and hardness surface are properly mounted, presses a start buttom on KB73. The computer 50 instructs the machine tool 18 to move the cutting tool point from "machine zero" position ($X_0$, $Y_0$, $Z_0$) to the position ($X_s$, $Y_s$, $Z_s$) shown in FIG. 4, a set distance $Y_3$ above the hardened surface A. The computer 50 then causes the spindle 41 to move downward toward the hardened surface in small increments (0.0001 inch). When electrical contact is made a circuit closes indicating contact (a suitable force differential could be used), and the spindle is caused to pause, allowing the readings to stabilize. The force $F_1$ is read into computer 50. Then the spindle 41 is moved downward an additional 0.01 inches and allowed to stabilize again. A second force reading $F_2$ is taken and the difference in the two force readings is taken as the force required to deflect the tool-machine system 0.01 inches from the indicated position. It is important to note that it does not matter where the deflection is actually located (tool, spindle or table) nor does it matter if the force readings are not exactly in pounds so long as the machine tool 18 being used for the measurement is the same machine tool 18 that will use the measurement in a deflection controlled metalcutting situation or similar use.

The closed-loop machine-tool calibration system, is shown in FIGS. 8A, 8B, 8C and 8D. Major elements of the system are a process control computer 50 shown as elements 19 and 11 which includes as peripheral items an analog-to-digital converter and multiplexer 23, and disc storage unit 10. Other major elements of the system are the interface unit 38, numerical control controller 14 and machine tool 18.

Within the process control computer 50 and specifically the motion control module element 11 data is delivered to the digital data output cable 51. That data is made available through cables to the interface 38 where cable 12 supplies the data to demultiplexor 16. The demultiplexing of the data is controlled by bits 0 and 1 on cable 51. If bit 0 is on, the data is motion control data and is gated out gate 37 via cable 312 to controller 14. But, if data is binary rate multiplier (BRM) data, bit 1 is on and that data is gated via cable 412 out gate 48 to binary rate multiplier (BRM) 29. Motion control data is gated out gate 37 and passed to the numerical control controller 14 through the same cable 312 to inputs normally fed by the amplifiers of a paper tape reader usually contained in numerical control controllers. The transfer of this motion control data between the computer 50 and the controller 14 is governed by motion control data timing unit 36, as described in detail in copending U.S. patent application Ser. No. 267,802 of Lankford et al.

Unit 36 responds to signals on cycle start line 61 and tape drive line 62 both from the controller 14. Pulses on both 61 and 62 trigger a single shot to generate a pulse of about 3 milliseconds duration, which triggers a second single shot to generate a pulse of 10 microseconds duration which is transmitted on line 65 to the computer 50 as an interrupt signal. Cycle start line 61 from controller 14 indicates a state of readiness at machine tool 18 and this function is provided by many conventional controllers. The tape drive line 62 is also found on controllers with paper tape input. Tape drive line 62 carries a signal calling for the "tape drive" to feed new data. The interrupt generated in computer 50 calls for a new block of data. When computer 50 brings up the first character of a new block of data it raises a line 66 called DAO ready. Line 66 is connected to timing unit 36 in interface 38. In unit 36 a 1 millisecond single shot is connected to line 66, and its output passes to controller 14 on a sprocket line 68. The sprocket line 68 is a common line in any device feeding a paper tape input interface. The sprocket line pulse indicates to the receiver of the data (controller 14 in this case) that the data in the machine is ready to be taken. The signal on sprocket line 68 is inverted in unit 36 by an inverter and supplied to an AND connected into another 1 millisecond single shot followed by a 10 microsecond single shot which has its output connected to DAO Sync. line 73. A DAO Sync. line signal is sent to computer 50 and logically instructs computer 50 that the piece of data which triggered the DAO ready signal has been accepted. The ultimate result of a signal on DAO Sync. line 73 on the channel of computer 50 will be made ready the next character of the block on the digital output lines 51. The function of the last named AND is to protect against sync. pulses being sent when the tape drive line 62 is down and to assure that no sync is sent out on the last character. The last character is indicated by the presence of an EOB bit indicated to timing unit 36 on the interface line 39 in FIG. 3A connected to output bus 51 through demultiplexor 16.

Using the motion control data on lines 51 the controller 14 logically commands the machine 18 to perform auxiliary functions such as to turn on spindle 41 etc. and to move the axes to complete the machining functions. A dynamometer 33 is installed on machine tool table 35. Dynamometer 33 measures cartesian forces $F_z$, $F_y$, and $F_x$ imposed by tool 41 upon work 75 indicated by dynamometer 33. During normal machining a work piece 75 to be machined with the tool 76 in spindle 41 is located on top of dynamometer 33. The dynamometer lines 77, 78, and 79 are connected to amplifiers 34, as is spindle speed line 17 connected to a tachometer 70 secured to spindle 41. The amplifiers 34 in the interface 38 feed an analog-to-digital converter and multiplexor 23 of the variety found in standard data acquisition, process control computers.

Contact of the tool 76 with the work 75 (which is presumed for purposes of explanation to be conductive) is sensed by line 63 connected to interface 38 (amplifiers 34), AND converter and multiplexor 23 and then computer 50 in that sequence. Normally, line 63 connected to the junction of resistors 64 and 164 is maintained at a potential determined by potential source 264 connected between ground and one end of resistor 64 with resistors 64 and 164 in series, so that machine tool 18, table 135 and the other end of resistor 164 are all connected to ground. Work 75 is supported on table 35 by insulating pad 265 and clamps and screws 266 holding work 75 on table 35 are insulated from work 75 by pads 267. Line 63 is connected to the junction between resistors 64 and 164 because they function as a voltage divider for the potential of potential source 264. Thus, until contact of the tool 76 with work 75, line 63 is biased by the voltage divider. Contact of the tool 76 changes that potential to ground level, and clamps line 63 at ground, thereby signalling contact of tool 76 and work 75 to computer 50 by the path described above.

The flow of data from the computer is described below. Feed rate control data is transferred from the output buffer 15 within computer 50. This data is transferred via cable 51 to demultiplexor 16 within interface 38. Data from the gate 48 is fed to the BRM binary rate multiplier 29. This variety of device is described in Handbook of Automation Computation and Control by E. N. Grabbe; 1959; published by Wiley & Sons. Within most controllers 14, which have pulse driven interpolators, is found a line carrying pulses whose frequency is proportional to the commanded feed rate. In this system that line normally going to the axis interpolators has been cut. The generating side has been taken to deliver the pulses on line 30 to the BRM 29 in interface 38. The BRM 29 returns a fraction of those pulses on output line 31 to controller 14 where it is spliced into the above-mentioned severed line to the axis interpolators. Thus, BRM 29 controls the rate at which pulses feed the axis interpolators in controller 14 and therefore the motion and velocity of the axes of tool 18.

Disk 10 contains part programs (described in detail in Ser. No. 267,802) supplied to motion control module 11 which includes a FILBF subprogram which fills a disk buffer with part program and adaptive control data. An EXPND subprogram takes "paper tape" numerical control data from the disk buffer to fill output buffer 15. An OUTPX subprogram transmits data from buffer 15 to N. C. controller 14 on demand via lines 51 and 12, digital output interface 38 and its demultiplexor 16, and gates 37 and 48 to control machine tool 18. The disk buffer supplies adaptive control data to an adaptive control module of computer 50 under control of ACSCN adaptive control scan subprogram, distributing the information to adaptive AMC parameter registers synchronized with data to controller 14.

Figure 7:
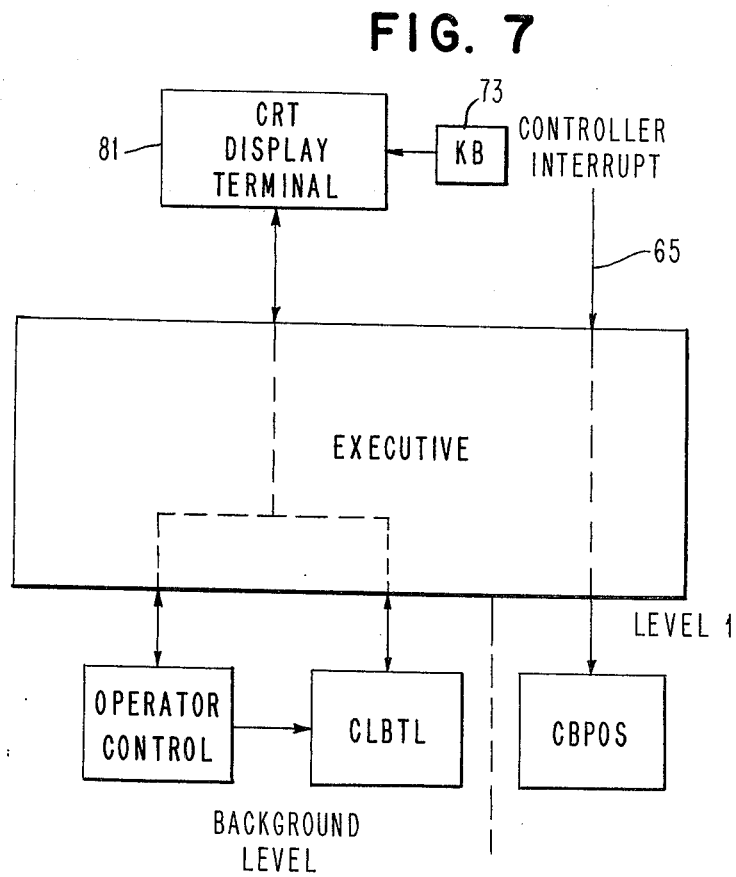
FIG. 7 shows the overall system organization of a computer control system adapted to provide computer control of calibration in accordance with this invention.

Computer 50 is preferably an IBM 1800 containing an executive program as shown in FIG. 7.

A FORTRAN COMMON area called INSKEL COMMON, is located in the executive of computer 50. This area is accessible to all programs. It contains all the calibration parameters. Data can be communicated among the various program modules being executed in a multiprogramming environment. At cold-start time initial values are read from a parameter file and loaded into this area. Certain of these values can be changed by control parameter cards in any part program.

The functional components of the computer calibration software are shown in FIG. 7. They are the executive operator control, CLBTL (calibration program) and CBPOS, which controls tool positioning into contact with the work and measuring of deflection forces $F_2$ and $F_1$ for calculating tool deflection.

The Control Program

This program is designed to calibrate a tool, determining pounds of force required to deflect a specified tool 0.001 inch. Also computed is the error between actual and estimated tool diameter, giving indication of tool wear. It is designed to operate under control of the system shown in FIG. 5 (FIG. 5 of "Adaptive Numerical Control of Machine Tool In Response to Deflection Forces Transverse to Cutting Path" shows it in more detail). This system is described in detail in U.S. patent application Ser. No. 267,802.

The program consists of two routines, CLBTL, and CBPOS. CLBTL is initiated via a request through the Operator Control Function via keyboard 73 and the CRT Display Terminal 81 and executes at the background level as shown in the overview in FIG. 7. CLBTL loads into core the routine CBPOS which is driven by interrupts generated by the controller and initiated when the operator presses cycle start. These two routines are multiprogrammed with one another. Communication between the two routines is achieved by means of a calibration switch (KBSW) and an error switch (KEBSW). After CBPOS is set into execution CLBTL loops on KBSW waiting for CBPOS to set KBSW = 9, indicating that the tool has been positioned and a measurement taken, or that a positioning error occurred. In the latter case KEBSW is set equal to one.

FIG. 10 is a detailed flowchart of how the two routines function. First CLBTL loads CBPOS into core. CLBTL loads CBPOS into core. It then picks up the tool length and diameter estimates entered by the operator and verifies them as reasonable. Using tool length, TLNG, and estimated tool diameter, TLDE, the X, Y, and Z starting coordinates are computed as follows:

$X_s = X_c$
$Y_2 = Y_c + TLDE/2 + POFF$
$Z_2 = Z_c + TLNG$

Where $X_c$, $Y_c$, $Z_c$ = desired starting position where tip of tool is to be before moving tool into the hardened surface, $X_s$, $Y_s$, $Z_s$ = actual coordinates which must be specified to controller when tool of length $TLNG$ and diameter $TLDE$ is used, $POFF$ = offset of actual tool tip from hardened surface at point S before final movements to touch the surface 72 and calibrate the system. CLBTL then displays the message PRESS CYCLE START and waits in a loop testing the program switch KBSW. CBPOS takes control when cycle start is pressed, and positions the tool. When complete, CBPOS sets KBSW = 9 signaling CLBTL to continue, checking for any positioning errors and computing deflection force and tool diameter error. Tool diameter error is computed as $((POFF/0.0001) - C)* 0.0001$ Where $C$ = number of 0.0001 inch increment moves required to touch the hardened surface after positioning at the starting point, and
$POFF$ = positional offset.

As mentioned above, CBPOS is repeatedly executed via interrupts from the controller. The first interrupt is executed due to the operator pressing cycle start on the controller. Subsequent interrupts are generated at the completion of each command execution by the controller. With each interrupt CBPOS transmits a new command until the tool positioning is complete, at which time a program stop is sent and KBSW set equal to 9. The tool is first moved to a starting point, $X_s$, $Y_s$, $Z_s$ (see above) from which it is moved in the −Y direction in 0.0001 inch increments until it just contacts a hardened surface. A special contact detection sensor is used and is read by the program to determine contact. After touching, the tool is moved an additional 0.01 inch and the force differential computed. Force per unit deflection values are determined by reading the Y-axis force sensor of a dynamometer attached to the tool and dividing by the deflection. They are then displayed to the operator via the CRT display 81.

The force values can be determined for a number of tools and compiled into a table and used in assigning a maximum deflection force value based on a desired cutting tolerance. This value can then be used by the adaptive control funciton in controlling feedrate by keeping below the maximum force value and hence within the desired cutting tolerance.

SYSTEM, CONTROL PROGRAM, AND FLOW CHARTS DESCRIBED IN DETAIL AS TO SEQUENCE OF OPERATION

Figure 8A:
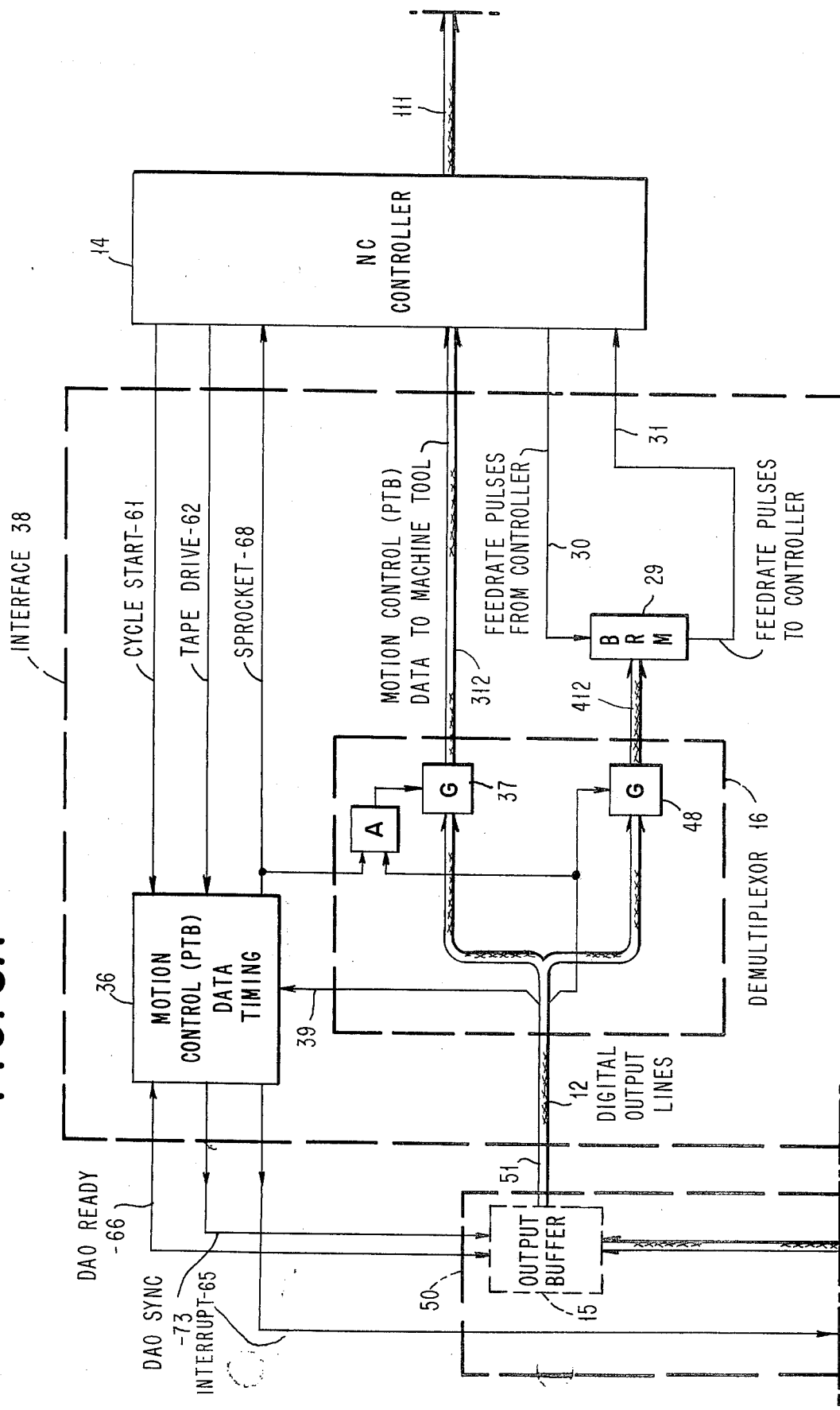
Figure 8B:
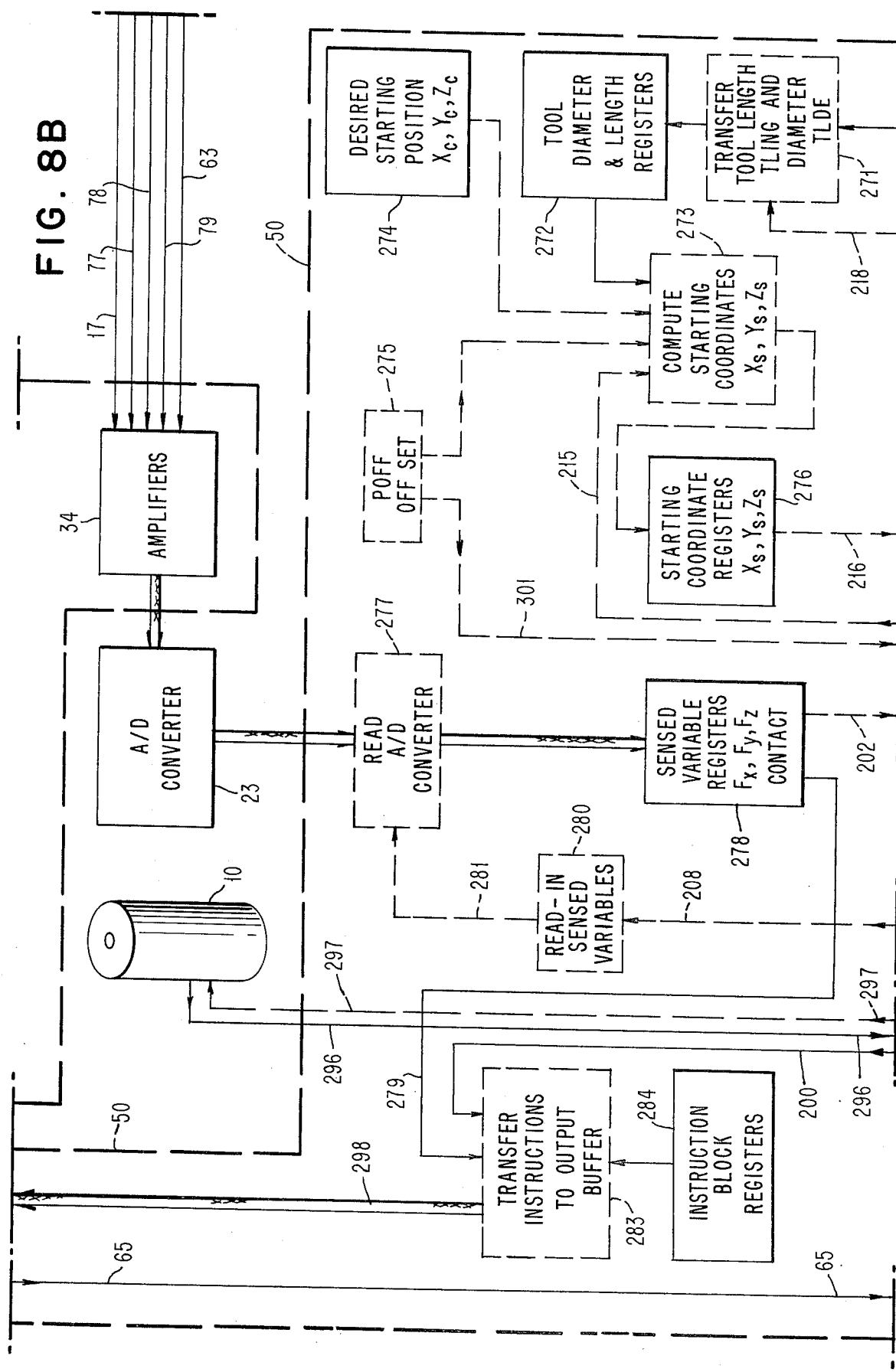
Figure 8D:
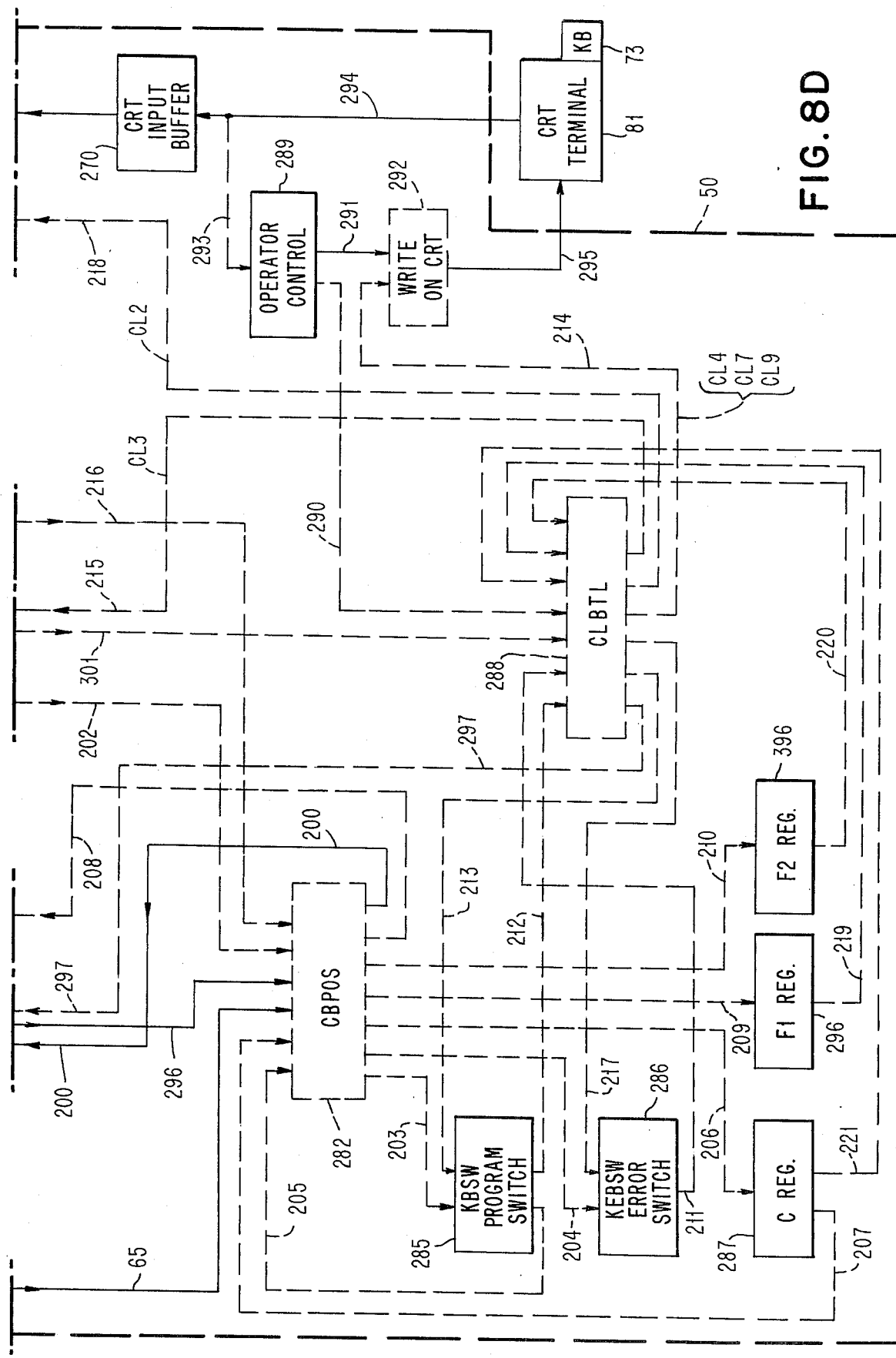
Figure 9B:
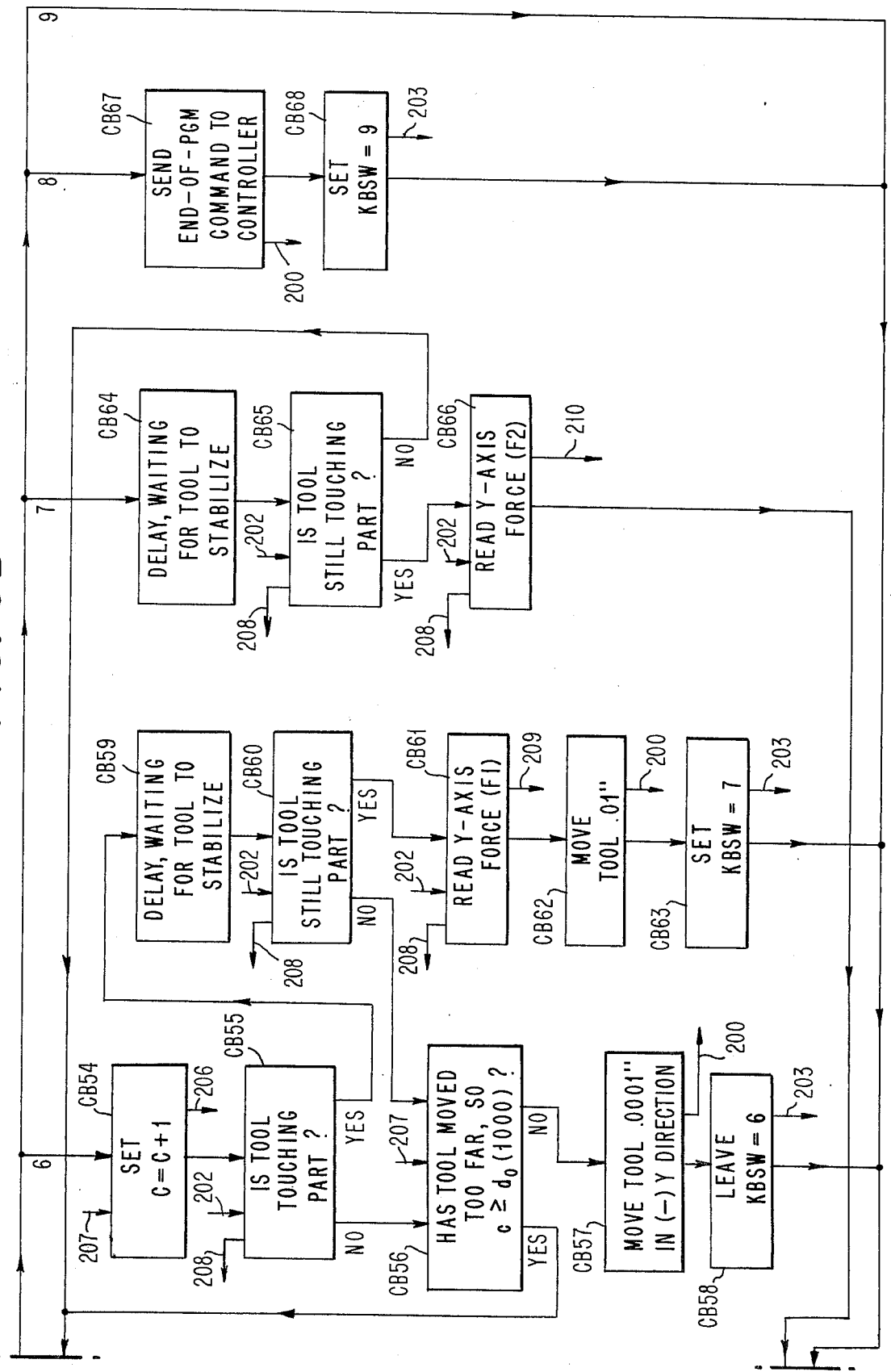

In FIGS. 8B and 8D is shown a schematic block diagram of the program functions carried on in computer 50 in software form along with various registers employed for the purpose of storing data used during the execution of the programs in accordance with this invention designed for an IBM 1800 computer. It should be understood that the various program functions can be performed by special purpose hardware, but that the preferred embodiment of the functions is shown here in software form. The computer 50 will be discussed in combination with program flow charts for CLBTL in FIG. 10 and CBPOS in FIGS. 9A and 9B. The first step CL1 of CLBTL program 288 is to load CBPOS program 282 into the core of computer 50 as shown in FIG. 8C, from disc 10 via line 296 to CBPOS, under control of disc control signals on line 297. From CLBTL at the same time via lines 213 and 217 (from CL1 to CLBTL) shown in FIG. 8, the registers KBSW (program switch) 285 and KEBSW (error switch) 286 are reset to "1" and "0", respectively. CBPOS can begin at any time after this in time sharing with CLBTL, but will not start until the "interrupt from controller" signal on line 65 from timing unit 36 is received by CBPOS 282, as step CB1. Program CLBTL in step CL2 then reads tool length TLNG and tool diameter TLDE from CRT input buffer 270 (connected to CRT terminal 81 via line 294) and CL2 causes the transfer on line 271 of TLNG and TLDE into the Tool Length and Diameter Registers 272. Next, program step CL3 calculates $X_s$, $Y_s$ and $Z_s$ values which indicate what the actual X, Y and Z positions will be at the beginning of the calibration sequence of motions of tool 76 when moving into contact with hard surface 72. This calculation involves the formulas set forth above. $X_c$, $Y_c$, and $Z_c$ register 274 values are combined, with POFF 275 and TLDE and TLNG register 272 values in computer starting coordinates block in response to CL3 on line 215. The values $X_s$, $Y_s$, are set in registers 276.

Note that KBSW was set to branch 1 at the beginning step CL1 as stated above. Thus as shown in FIG. 9A the program CBPOS will simply cycle through the CB2 test of KBSW and then through branch 1 to return over and over, until KBSW is set to branch 2. Then in step CL4 KBSW is set to branch 2 via line 213 from CLBTL to KBSW (FIG. 8D) and the operator is instructed to press cycle start via line 214 to the Write on CRT block 292 to line 295 to the terminal 81 (FIG. 8D). Then, preferably, when the cycle start button on keyboard 73 is hit the system starts to perform program CBPOS, FIG. 9A and branches to CB21 in which it sends control signals onto line 200 into transfer unit 283 (FIG. 8B) to transfer the tool change position values $X_0$, $Y_0$, $Z_0$, in instruction registers 284 to the output buffer 15, via cables 298. The start button operation can be omitted from the program. This data will be transferred through the interface 38 to controller 14 to position the tool 76 in the retracted tool changing position, in accordance with the above discussion of FIGS. 8A and 8C. In step CB22, KBSW is set to 3 via line 203 to KBSW (FIG. 8D). Then in step CB31, CBPOS reads $X_s$, $Y_s$, $Z_s$ from registers 276 via input line 216 and output line 200 into transfer 283 to buffer 15 along with a rapid traverse command from instruction block registers 284. Then program step CB32 sets KBSW to 4 via line 203 (FIG. 8D).

In branch 4, step CB41 tests whether the tool is touching the part from line 202 from sensed variable register 278 (FIG. 8D). If No, then it branches to step CB42 in which the controller feedrate is set to a moderate value by means of a signal on line 200 to send out a BRM control signal. Note that CB41 sends a signal on line 208 to the read-in sensed variables block 280 (FIG. 8B). Block 280, actuates the read A-D converter block 277 via line 281. Next in step CB43 KBSW is set to branch to 5. If the result of test CB41 was Yes, then the program branches to step CB44 setting KEBSW to 1 via line 204 (FIG. 8D) to indicate an error which in this case is that by plan, the tool 76 should not touch the part 75 when it is in the start position. Step CB44 leads to step CB45 where the tool is returned to the origin via line 200. In step CB46, KBSW is set to jump to branch 8.

In branch 8 program step CB67 sends an end of program command over line 200 to the controller 14. Step CB68 sets KBSW to 9, via line 203. In branch 9, the program recycles through return until another cycle of CLBTL resets KBSW to 1.

Returning to the pattern of the branch down to CB43, with the branch to branch 5, C is set to 0 which is stored in C register 287 via line 206. C is a register for a count of the number of 0.0001 inch increments the tool has been moved, preferably along the y axis towards the part beyond position S.

Next, step CB52 moves the tool 0.0001 inch in the $-Y$ direction putting a command control signal on line 200. Step CB53 causes a KBSW = 6 command to change the program to branch 6.

There, in step CB54, register C287 is supplied the sum of $c+1$ via line 206. The old value of c is secured from line 207 from c register 287. Next, step CB55 tests line 202 from registers 278 to determine whether the tool is touching the part, now. If not, in step CB56, a test is made to determine whether the tool has moved too far so $C > \delta_0(1000)$ where $\delta_0$ is a preset value in 0.1 inches representing the maximum error in initial tool offset. If the tool moves more than this amount, it is presumed to have missed the test pad 72 for some reason. If the result of the test is Yes, then the program branches back to step CB44 described above. If the result of the test in CB56 is No, then the program branches to step CB57 which like step CB52 increments the tool another 0.0001 inches via line 200. Then step CB58 resets KBSW to 6 via line 203, and passes through return CB70 then starting branch 6 again. Note that branch 6 can be repeated several times until the tool touches the pad 72.

If the result of test CB55 is Yes, then the program branches to block CB59 providing a time delay for the tool to stabilize after having touched the part. Then in step CB60 contact of the tool is retested by lines 208 and 202, as before. If no constant exists, then the branch is to CB56 which is described above. If the result of test CB60 is yes, then the branch is made to branch CB61 which signals on line 208 to read in force $F_1$ from register 278 which is the current $F_y$ deflection force at this first point of contact of tool 76 with the pad 72. Force $F_1$ is stored via line 209 into register 296. Now in step CB62, the tool is moved 0.01 inch in the $-Y$ direction providing an output on line 200. Then step CB63 sets KBSW to 7 via line 203 and passes to return CB70.

In branch 7, step CB64 again delays for the tool to stabilize. In step CB65 lines 208 and 202 test whether the tool is still touching the part. If not, a branch to CB44 reports an obvious error condition which probably shows the tool is broken or off to one side of the pad, etc. If CB65 tests YES, then step CB66 reads force F2 on the Y-axis via lines 208 and 202 from register 278, and stores the result via line 210 into register 396. Then the program advances to CB45 to run to completion as described above, through branches 8 and 9.

At this point in the program the branch test CL5 which has been cycling to determine whether KBSW=9 determines via line 212 that CBPOS is ended as KBSW does equal 9, and on the Yes answer CL5 branches to step CL6.

In step CL6 a test is made via line 211 from KEBSW register 286 for an error, with KEBSW = 1. If yes, in step CL7 an error message passes via line 214 to CRT81 via block 292 and line 295 and thus the program exits in step CL10.

If the result of test CL6 is No, the CBPOS has been successful in preparing for calibration and in step CL8, the tool deflection is calcualted with $F_1$ from register 296 via line 219, $F_2$ from register 396 via line 220. In addition, the diameter error $E_D$ is calculated with $E_D = [(POFF/0.0001) - C]$. [0.0001] which measures the difference between TLDE and TLD where TLD is actual tool diameter where C measures $Y_3$.

In step CL9 the values in step CL8 are read via line 214 to the CRT81. Step CL10 ends the program.

Figure 5:
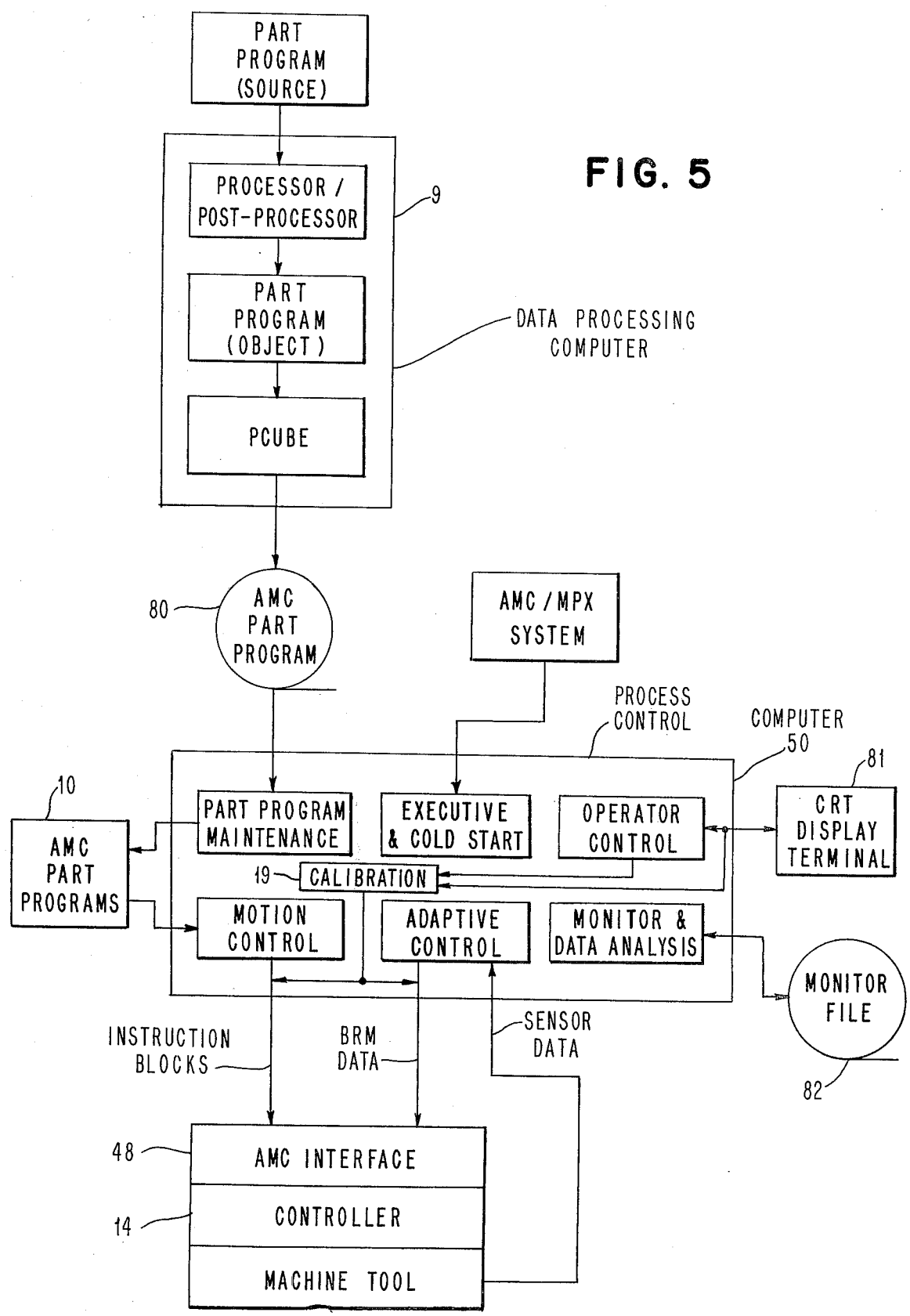
FIG. 5 shows a general computer system into which the current calibration invention is inserted to provide additional automatic numerical-control features. Details of this system are described in application Ser. No. 267,802, referred to above.

Calibration is intended to be a part of a complete advanced motion control (AMC) system shown in FIG. 5. This system involves both a process control computer 50 for controlling the machine tool 18 and a data processing computer 9 for preparing part programs to be used by the machine tool controller 14 in producing parts. A description of the software components of this system follows showing how the particular components for path sensitive constant force machining relate to the total system.

The purpose of the data processing computer 9 is to prepare the AMC part programs which include adaptive control data, for execution by the process control computer 50. The conventional NC processor accepts as input source language part programs, translating them into machine language (object) part programs with the aid of the necessary post-processors. These are in turn processed by a special program, called PCUBE (for post-post-processor), which formats the part program on magnetic tape for entry into the process control computer 50. Also PCUBE adjusts feedrates specified in a part program to high values so that they can be modified dynamically down to the desired values, when cutting a part. It also includes user-specified maximum force values for cuts. These maximum force values are used by the process control computer 50 to control the tolerances within which the part is cut. PCUBE is written in PL/1 and can operate under control of IBM 360/OS.

This AMC software is written primarily in FORTRAN, with some program modules coded in assembler language. It is executed under control of the IBM 1800 multiprogramming executive (MPX) operating system. The software is a collection of program modules that are combined and built into executable coreloads by the MPX. These coreloads are then loaded and executed by the MPX according to the various real-time conditions that occur. The system is so designed that various adaptive control algorithms can be built into such coreloads and then loaded under operator control. These coreloads remain core resident during the cutting of a part and are termed the MC & AC coreloads, since that coreload area contains the essential modules for performing both motion control and adaptive control. In this manner various adaptive control algorithms can be tested.

The total core used is 40K, with the following partitions assigned:

| | | |
|---|---|---|
| 1. Executive MPX area | | 24K |
| 2. MC & AC coreload area | | 6K |
| 3. Spare partition | | 2K |
| 4. Variable core | | 8K |

Part programs prepared as described are written onto magnetic tape 80 to be used as input to the process control computer 50. The tape 80 is employed as a common storage medium between the two computers 9 and 50, though other media are possible depending on the computers used.

The primary purposes of the advanced motion control software in the process control computer 50 are
 1. Direct numerical control (motion control) of the machine tool 18.
 2. Adaptive control of the cutting process, and
 3. Data analysis of the system.

Direct numerical control involves transmitting to the machine tool, under computer control, the commands necessary to make a part. Adaptive control involves modifying the cutting process in real time in order to satisfy some index of performance. Data analysis aids the engineer in evaluating the system and refining the adaptive control techniques.

Secondary purposes of the system are
 1. Operator control and
 2. Part program maintenance The executive comprises 20,250 words and includes user routines. The executive remains core resident once it has been loaded by the cold-start procedure. The MC and AC coreload used is 3460 words in size, and, remains core resident for the duration of one part program's execution. Variable core (VCORE) is an area where various coreloads can be rolled in and out as needed on a shared basis. For example, when the display terminal 81 requests attention, the coreload currently resident in VCORE is saved on disk, and the terminal 81 attention routine is loaded from disk. When the attention routine is complete the original coreland is loaded again into core, and its execution continues.

A FORTRAN COMMON area called INSKEL COMMON, is located in the executive. This area is accessible to all programs. It contains all the adaptive control parameters. In this manner data can be communicated among the various program modules being executed in a multiprogramming environment. At cold-start time initial values are read from an adaptive control parameter file and loaded into this area. Certain of these values can be changed by adaptive control parameter cards in any part program.

The functional components of the computer 50 AMC software are shown in FIG. 5. They are part program maintenance, executive and cold start, motion control, adaptive control, operator control, and monitor and data analysis.

Part Program Maintenance

The part program maintenance component of the AMC software reads the part programs from tape, creates a part program file and an idex, and loads them onto disk 10. Entries are added to or deleted from the file and index as part programs are added to or deleted from the system. Then, when a part program is requested by the operator for execution, a search of the index is made of that part program, which is designated by an eight-character identification. If found, the location is identified to the motion control component, and sectors of the file containing the part program are loaded by motion control into core as the part program is being executed. Another function of the part program maintenance component is to list part programs on the printer upon request. A control card containing the tool feedrate number is placed (optionally) in front of the card deck. This ratio specifies by what amount PCUBE is to multiply the programmed feedrate. Multiplication is necessary because the programmed feedrate selected by the part programmer will have been chosen for use with traditional numerical control techniques (i.e., without adaptive control). The BRM 29 on the other hand, can only reduce, in varying degrees, this basic programmed feedrate. To allow the BRM 29 a range that not only includes but exceeds the programmer's estimate of feedrate, that feedrate is multiplied in the PCUBE phase processing. For example, if the part programmer initially programmed a cut at 10 ipm, one would reasonably expect that in some regions (perhaps air gaps in the cut) the adaptive control system would find it worthwhile to cut at a feedrate above 10 ipm. If the programmed feedrate sent to the controller is 10 ipm, the BRM 29 can only reduce the feedrate, in varying degrees, below 10 ipm. To allow the BRM to control feedrate above that originally programmed, a higher feedrate (perhaps 20 or 30 ipm) must be sent to the controller 14. In this case, the 10-ipm feedrate would be multiplied in PCUBE by a feedrate ratio number.

The remaining cards in the card deck consist of a header card (which follows the control card), leader cards, adaptive control parameter cards, the instruction-block cards. The header card assigns a part number to the part program. Leader cards are included to produce paper-tape leader in conventional systems. They are ignored by PCUBE. Adaptive control parameter cards contain data necessary to modify the control algorithm for the particular part. The instruction-block cards contain the commands that operate the machine tool. There is one block of commands per card.

Software for the process control computer 50 consists of the following six components using 40K as shown in FIG. 5:
 1. Executive and cold start
 2. Part program maintenance
 3. Operator control
 4. Motion control
 5. Adaptive control
 6. Monitor and data analysis The executive is carried out by the MPX program and is a main-storage-resident component that provides the services of interrupt processing, program queuing and loading, system error checking, system reload and restart, and multiprogramming. The cold-start function initially sets up the system and loads AMC parameters from disk 10 into main storage.

The part program maintenance component reads the part program from tape and creates a part program file on disk 10, and adds or deletes programs from the file. Operator control provides an interface between the system and the operator. Using a display terminal 81 he can inquire about the status of the system and modify the AMC parameters. He can control the execution of part programs also. The monitor and data analysis program samples data during the cutting of a part and writes that data onto tape 82. This data can then be plotted or further processed using data reduction techniques.

The two program components directly concerned with real time control of the cutting process are the motion control and adaptive control programs. The purpose of the motion control program is to direct the machine tool along the conventional part program. The purpose of the adaptive control component program are to:
1. Continually sense the cutting process
2. Derive a control variable(s) based on some index of performance, and
3. Modify the cutting process by using the derived control variables.

As shown in FIG. 5 motion control, on demand, sends instruction blocks to the controller 14 via the AMC interface 48. While this process is going on adaptive control is also executing via the multiprogramming capability provided by the executive. At regular intervals controlled by a hardware timer it is sensing the process at the cutting tool and modifying the feedrate using the binary multiplier BRM 29 in the AMC interface 48.

Calibration Function

An essential function of the AMC system is the calibration of tools for use in the cutting process. In order to control the cutting tolerance, it is necessary to determine the amount of force required to deflect a tool a given distance. Knowing this force the adaptive control component in real time can limit the deflection force by continuously modifying the feedrate. In coding a part program, the part programmer indicates for a particular cut the desired tool and cutting tolerance. Then, the maximum force corresponding to that tolerance is computed from a value associated with a tool and stored in a tool file at the host system. The post processor (which must be modified for adaptive control) accesses the previously mentioned tool file and computes a maximum deflection force which can be tolerated and still have the specified cutting tolerance maintained. This force is passed along as part of the AC data associated with the instruction block. This is then read as input with the part program when it is executed. The maximum deflection force is passed to adaptive control by motion control just before the cut is executed. Having this force, adaptive control then begins adjusting the feedrate by storing values in the binary rate multiplier. Tool calibration is performed as described above using a machine tool not in the process of cutting a part. It can be done, however, while other machine tools attached to the system are cutting parts.

The operator mounts the tool to be calibrated in the spindle holder. At the operator terminal, the operator requests that the calibration function be performed and enters the tools length and diameter. When ready, the calibration routine asks the operator to press cycle start. When cycle start is pressed, the tool is positioned just above the hardened surface and then moved in small increments until contact is made with it. Contact is detected by a change in deflection force which is computed by the calibration routine after each incremental movement. The tool is then moved a fixed interval farther and the force is measured again. The force differential between contact and the additional movement divided by the distance moved is the force per unit distance to the tool and is reported to the operator. This value can then be stored in the tool file by the operator. The error noted in the tool diameter between the value entered by the operator and the value computed is determined. This is reported to the operator and gives indication of tool wear.

In order to carry out a calibration function while the system is in operation performing motion and adaptive control, the calibration component must be coordinated with the motion control component. The MC program must be able to transmit one instruction block at a time to a controller 14 informing calibration when the next instruction block is to sent. Calibration in turn must inform MC when to begin transmitting characters of an instruction block and must present the instruction block to MC. This is accomplished by assigning, in addition to the regular set of disk buffers, a special calibration buffer capable of holding one instruction block. Also, a set of switches is assigned to permit coordination. When calibration is to be done, a switch is set informing MC that it is to retrieve data from the calibration buffer. Calibration then loads a buffer and sets a switch indicating to MC that the buffer is full. If this is the first block, calibration requests that the operator press cycle start. This causes the run line to come up signaling MC to begin transmission of characters to the MCU. Transmission is terminated by MC after the EOB character is sent. After the run line drops and comes up again, MC sets a switch telling calibration that the MCU is ready for the next instruction block. This is a signal to calibration that the previous instruction block has been executed and calibration can now set up the next instruction block in the buffer or read the cartesian forces and compute the force of deflection. Calibration continues in this manner to send one block at a time until the tool has contacted the hardened surface 72 and deflection has been computed. A final end-of-program block is transmitted and MC is signaled that calibration is complete.

Implementation of this calibration system in an 1800 control computer is the preferred embodiment.

What is claimed is:
1. In a computer controlled numerical-control system,
   an object,
   a numerically-controlled machine tool indluding force sensing means for sensing deflection forces,
   control means for controlling said numerically-controlled machine tool,
   data means for generating data directing said tool towards contact with said object having an output coupled to the input of said control means,
   incrementing means for incrementing said tool towards said object subsequent to contact,
   said incrementing means having an output coupled to the input of said control means,
   register means for recording amounts of displacement, calculating means for calculating the deflection force as a function of tool displacement including an input connected to said force sensing means and said register means, said calculating means receiving measurements of said deflection forces from said sensing means at a first tool position in contact with said object, and said calculating means receiving measurements of said deflection forces from said sensing means at a second tool position in contact with said object and spaced from said second tool position.

2. Apparatus in accordance with claim 1 wherein said machine tool includes contact sensing means for sensing contact of a tool with said object, said incrementing means having an input coupled to the output of said contact sensing means.

3. Apparatus in accordance with claim 2 wherein means is provided for measuring travel from an arbitrary reference point to a point coinciding with sensing of contact by said contact sensing means.

4. Apparatus in accordance with claim 1 wherein means is provided for measuring travel from an arbitrary reference point to the point of deflection sensing by said force sensing means.

5. A computer controlled machine tool system for calibrating the force deflection characteristics thereof comprising,
a tool,
an object firmly supported upon a base,
means for moving said tool towards said object,
means for sensing contact of said tool with said object,
means for measuring deflection forces at a first tool position in contact with said object,
means for measuring deflection forces at a second tool position in contact with said object and spaced from said first tool position,
and means for calculating deflection forces as a function of tool displacement between said separate positions.

6. Apparatus in accordance with claim 5 wherein said means for moving drives said tool in a predetermined direction between said first and second tool positions.

7. Apparatus in accordance with claim 5 wherein said means for moving drives said tool into contact with said object with deflection of said tool transverse to the axis of said tool.

8. Apparatus in accordance with claim 7 wherein said means for moving drives said tool to deflect transverse to the direction of travel of said tool.

9. A method for operating a computer controlled machine tool system for calibrating the force deflection characteristics thereof comprising,
moving said tool towards an object firmly supported upon a base,
sensing contact of said tool with said object,
measuring deflection forces at a first tool position in contact with said object,
measuring deflection forces at a second tool position in contact with said object and spaced from said first tool position,
and calculating deflection force as a function of tool displacement between said separated positions.

10. A method in accordance with claim 9 including moving said tool in a predetermined direction beteeen said first and second tool positions,
driving said tool into contact with said object with deflection of said tool transverse to the axis of said tool and the ultimate direction of travel of said tool during a related subsequent cutting operation.

11. Apparatus in accordance with claim 5 including first means for measuring the actual distance of said tool from a starting position to contact with said object,
second means for storing a predetermined offset value,
and means for determining tool diametral dimension error as a function of values for said first means and said second means.

12. A computer controlled machine tool system for measuring the tool size of a tool comprising
a machine tool,
a tool in said machine tool,
an object firmly supported upon a base secured to said machine tool,
means for moving said machine tool to a predetermined position with said tool spaced from said object,
means for driving said tool into contact with said object,
and means for measuring displacement of said tool between said predetermined position and the position at which said contact occurs,
calculating means associated with said means for measuring for calculating the tool size of said tool as a function of the output of said means for measuring.

13. A machine tool system for calibrating the force deflection characteristics thereof comprising,
a tool,
an object firmly supported upon a base,
means for moving said tool towards said object,
means for sensing contact of said tool with said object,
means for measuring deflection forces at a first tool position in contact with said object,
means for measuring deflection forces at a second tool position in contact with said object and spaced from said means for determining deflection forces as a function of tool displacement between said separate positions.

14. Apparatus in accordance with claim 13 wherein said means for moving drives said tool in a predetermined direction between said first and second tool position.

15. Apparatus in accordance with claim 13 wherein said means for moving drives said tool into contact with said object with deflection of said tool transverse to the axis of said tool.

16. Apparatus in accordance with claim 15 wherein said means for moving drives said tool to deflect transverse to the direction of travel of said tool.

17. A method for operating a machine tool system for calibrating the force deflection characteristics thereof comprising:
moving said tool towards an object firmly supported upon a base,
sensing contact of said tool with said object,
measuring deflection forces at a first tool position in contact with said object,
measuring deflection forces at a second tool position in contact with said object and spaced from said first tool position,
and calculating deflection force as a function of tool displacement between said separated positions.

18. A method in accordance with claim 17 including moving said tool in a predetermined direction between said first and second tool positions,
driving said tool into contact with said object with deflection of said tool transverse to the axis of said tool and the ultimate direction of travel of said tool during a related subsequent cutting operation.

19. Apparatus in accordance with claim 13 including first means for measuring the actual distance of said tool from a starting position to contact with said object, second means for storing a predetermined offset value,
and means for determining tool diametral dimension error as a function of values for said first means and said second means.

20. A method for measuring the tool size of a tool with a machine tool, a tool in said machine tool, an object firmly supported upon a base secured to said machine tool, comprising
moving said tool with machine tool to a predetermined position with said tool spaced from said object,
driving said tool into contact with said object,
measuring displacement of said tool between said predetermined position and the position at which said contact occurs, and
calculating the tool size of said tool as a function of said displacement.

21. A method of operating a machine tool system for calibrating the force deflection characteristics thereof in a system including, a tool, and an object firmly supported upon a base, the steps including
moving said tool towards said object,
sensing contact of said tool with said object,
measuring deflection forces at a first tool position in contact with said object, and
measuring deflection forces at a second tool position in contact with said object and spaced from said means for determining deflection forces as a function of tool displacement between said separate positions.

22. A method in accordance with claim 21 wherein said tool is moved in a predetermined direction between said first and second tool positions.

23. A method in accordance with claim 21 wherein involving moving said tool into contact with said object in a direction providing deflection of said tool transverse to the axis of said tool.

24. A method in accordance with claim 23 wherein said tool is moved to deflect transverse to the direction of travel of said tool.

25. A method for operating a machine tool system for calibrating the force deflection characteristics thereof comprising:
moving said tool towards an object firmly supported upon a base,
sensing contact of said tool with said object,
measuring deflection forces at a first tool position in contact with said object, and
measuring deflection forces at a second tool position in contact with said object and spaced from said first tool position,
whereby calculation of deflection force as a function of tool displacement between said separated positions can be performed.

26. A method in accordance with claim 25 including moving said tool in a predetermined direction between said first and second tool positions,
driving said tool into contact with said object with deflection of said tool transverse to the axis of said tool and the ultimate direction of travel of said tool during a related subsequent cutting operation.

27. A method in accordance with claim 21 including first measuring the actual distance of said tool from a starting position to contact with said object,
storing a predetermined offset value,
and determining tool diametral dimension error as a function of values for said first measurement and said offset value.

28. A method for measuring the tool size of a tool with a machine tool, a tool in said machine tool, an object firmly supported upon a base secured to said machine tool, comprising
moving said tool with machine tool to a predetermined position with said tool spaced from said object,
driving said tool into contact with said object, and
measuring displacement of said tool between said predetermined position and the position at which said contact occurs,
whereby the tool size of said tool can be calculated as a function of said displacement.

* * * * *